Figure 1:
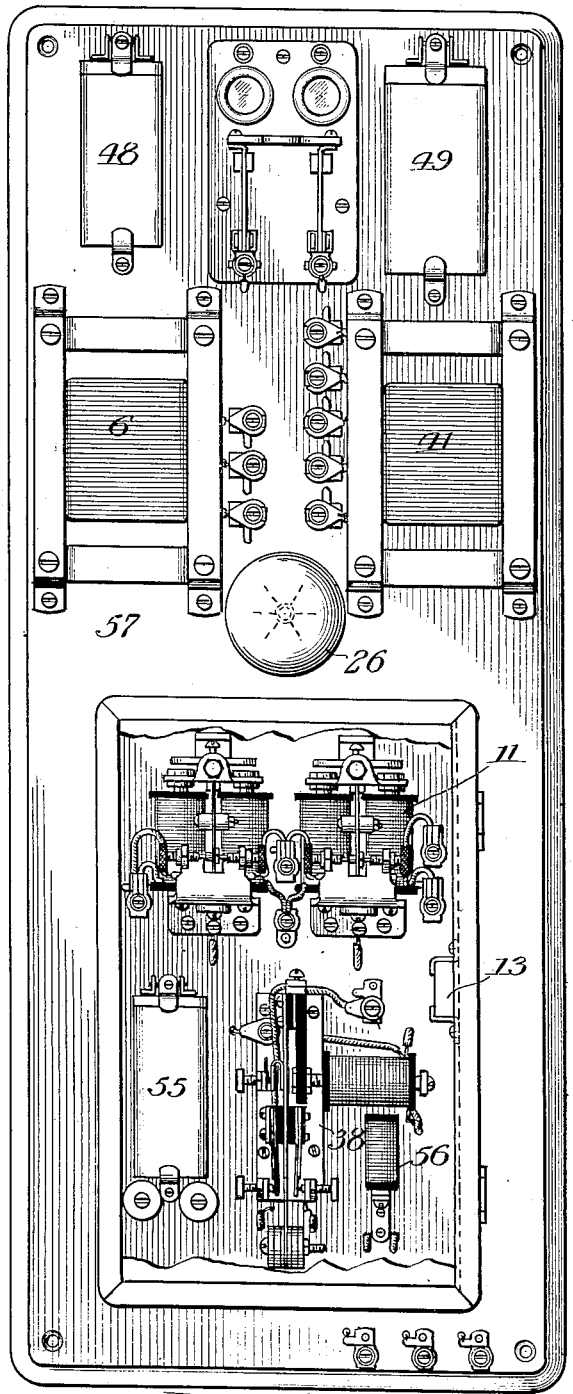

O. M. LEICH.
VIBRATORY CONVERTER.
APPLICATION FILED MAY 19, 1917.

1,291,942.

Patented Jan. 21, 1919.
2 SHEETS—SHEET 2.

Inventor
Oscar M. Leich
by [signature] Atty.

UNITED STATES PATENT OFFICE.

OSCAR M. LEICH, OF GENOA, ILLINOIS, ASSIGNOR TO LEICH ELECTRIC COMPANY, OF GENOA, ILLINOIS.

VIBRATORY CONVERTER.

1,291,942.

Specification of Letters Patent. Patented Jan. 21, 1919.

Original application filed September 28, 1915, Serial No. 52,995. Divided and this application filed May 19, 1917. Serial No. 169,637.

*To all whom it may concern:*

Be it known that I, OSCAR M. LEICH, a citizen of the United States, residing at Genoa, in the county of Dekalb and State of Illinois, have invented a certain new and useful Improvement in Vibratory Converters, of which the following is a full, clear, concise, and exact description, reference being had to the accompanying drawings, forming a part of this specification.

My invention relates to vibratory converters, and has for its object the provision of an improved converter of this kind which is an improvement more particularly of my co-pending application Serial No. 16,564, filed March 24, 1915. My invention contemplates in its general form the provision of a mechanism which can be supplied with alternating current, change this alternating current into uni-directional current, and then modify this uni-directional current into an alternating current of a different frequency than the impressed alternating current.

My invention is particularly designed for use in connection with twin vibrators for use in transforming alternating current into pulsating current. When using but one vibrator in connection with instrumentalities such as this and as shown in my co-pending application Serial No. 16,564, a differentially wound transformer is required as set forth in said co-pending application. To avoid the use of this differentially wound transformer I utilize twin vibrators so that an ordinary style of transformer can be used, thus extremely simplifying the construction and making the operation more uniform.

I find that I am enabled to obtain very effective results by using a pair of twin vibrators for rectifying purposes and then operating a pole changer in connection therewith, this pole changer coöperating with a transformer and a winding in bridge of the source of supply to furnish the required current of the desired frequency.

In a specific form in which my invention finds much application, such as providing ringing mechanism for telephone exchanges, this mechanism may be directly connected to the commercial form of alternating current, and will transform this current into alternating current of a suitable frequency for ringing purposes.

My invention herein is a divisional application of my prior application Serial No. 52,995, filed Sept. 28, 1915. In my said parent application, I show a system such as disclosed herein but the claims are directed not to the system as a whole, but to certain means by virtue of which I am enabled to successfully operate electromagnetic means for controlling synchronously operated twin contact elements.

In my present application, the claims are drawn to the system as a whole by virtue of which the device transforms alternating current of a given frequency to alternating current of a different fundamental frequency.

In my co-pending application Serial No. 52,996, I show a system of the general character disclosed herein which is provided with means whereby the outgoing current may be either of the alternating or pulsating current character.

In my co-pending application Serial No. 98,265, a system similar to the one disclosed herein is illustrated, which however is combined with an equalizer battery and means to effect its proper coördination in the circuit. In illustrating my invention I have chosen this particular form, and it is this particular form I will now describe in connection with the accompanying drawings illustrating such form, in which—

Figure 2:
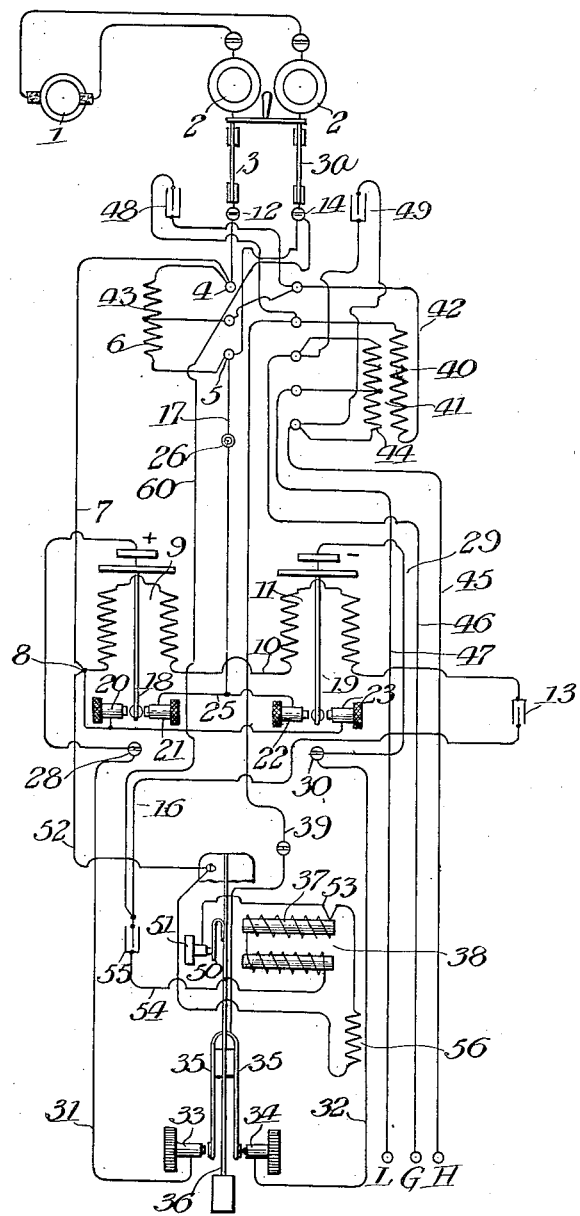

Figure 1 is a front view of a vibratory converter constructed in accordance with my invention, and Fig. 2 sets forth the circuit arrangements.

Referring more particularly to Fig. 2, I show a source of alternating current 1 which is led through fuses 2 by means of the switch bars 3 and 3ª to terminals 12 and 14. To terminal 12 is connected terminal 4 of the impedance coil 6, and terminal 14 is connected to terminal 5 of the impedance coil 6. A circuit extends from the binding post 4 by means of the conductor 7, to one terminal 8 of a vibrator 9, the current then extending through the coils of said vibrator by means of conductor 10, through the coils of the twin vibrator 11, condenser 13, conductor 15, conductor 16, conductor 60, to the terminal 14. Twin vibrators 9 and 11 are thus also connected directly across the circuit from the generator 1. These twin vibrators 9 and 11 vibrate their armatures and consequently the arms 18 and 19 respectively in accordance with the frequency of the current supplied by the generator 1, the condenser 13 serving to cause the current breaks due to these vibrations to occur at the proper time, that is, when the current is passing through its zero point. The arm 18 coöperates respectively with the contacts 20 and 21, and the arm 19 coöperates respectively with the contacts 22 and 23. The contacts 20 and 23 are connected together by means of the conductor 24, which then extends by way of conductor 7 to the terminal 4, which is one side of the impressed circuit. The contacts 21 and 22 are connected together by means of a conductor 25, and this conductor 25 is connected by the conductor 17 to the terminal 5 which represents the other side of the impressed circuit. The conductor 17 has a resistance 26 included in circuit therewith. It has been found in the operation of twin vibrators that at times there may be some inequalities in the operation of the arms 18 and 19, these arms momentarily being out of step, thus making a momentary wrongful contact. Under these circumstances a too large flow of current would cause the welding of the contacts and destroy the instrument. The resistance 26 serves the purpose of protecting both of the twin vibrators. The arm 18 is connected by means of conductor 27 with the contact terminal 28, and the arm 19 is connected by means of conductor 29 to the contact terminal 30.

We thus have at the contact terminals 28 and 30 a uni-directional current as the arms 18 and 19 vibrate in accordance with the frequency of the impressed current, and thus keep the terminals 28 and 30 positive and negative respectively. These terminals 28 and 30 are then connected by means of conductors 31 and 32 respectively to the contact posts 33 and 34. These contact posts are in association with spring contacts 35, 35, carried by a vibrating rod 36 which is operable by the electromagnet 37 of the vibrator 38. The arms 35 are connected together and extend by means of conductor 39 to one terminal of a primary winding 40 of the transformer 41, the other terminal of this primary winding being connected by means of conductor 42 with a central point 43 of the impedance winding 6. The circuit through the transformer winding 40 can be traced from the central point 43 of the impedance winding 6 by way of conductor 42, winding 40, conductor 39, contact 34 (alternately contact 33), conductor 32, binding post 30, vibratory element 19, and then to either of the contact elements 22 or 23 whichever happens at that time to have a negative potential, conductor 17 to the binding post 5 which is connected with the binding post 14, forming one side of the alternating current circuit. By virtue of current going through this path, current of a given polarity passes through the transformer winding 40 whenever contact 34 is in circuit. Similarly, when contact 33 is in circuit, current passes through the transformer winding 40 in the opposite direction. Thus we have alternating current established in the primary winding 40 of a frequency corresponding to the vibrations of the vibratory arm 36. A secondary winding 44 is in inductive relation with the primary winding 40 and furnishes its full voltage to the conductors 45 and 46. A conductor 47 is taken from an intermediate portion of the secondary winding 44 so that the conductor marked G may represent the conductor that is always used from this secondary winding for the local circuit, and the conductors marked L and H can be used for a low or high voltage as desired. The terminals of the primary winding 40 are bridged by the condenser 48 to smooth out the wave, and the terminals of the secondary winding are bridged by the condenser 49 for a similar purpose. The vibrator 38 has a contact spring 50 which coöperates with the stationary contact 51. The current to operate the vibrator 38 is furnished from the main circuit supplied by the generator 1, and can be traced from the binding post 4, via conductor 7, conductor 52, arm 36, contact elements 50 and 51, conductor 53, coils 37, conductor 54, condenser 55, conductor 16, to the terminal 14. Whenever the arm 36 is attracted and circuit through the elements 50 and 51 broken, the circuit is not entirely broken through the coils 37 as they are still included with the resistance 56, but that does not energize them sufficiently to prevent retraction of the armature 36.

The lamp 26 it will be seen is directly in circuit and prevents difficulty even if the machine does not operate properly due to a temporary variation in the positions of the elements 18 and 19. I am thus enabled to obtain an alternating current of a modified frequency from that of the impressed alternating current. The twin vibrators 9 and 11 serve to control the actuations a great deal better than if a single vibrator with a plurality of contacts is used, as the elements 18 and 19 must readily respond to the current to attain the best results.

The parts mentioned in this connection are all mounted on a suitable base plate 57 as shown in Fig. 1, the fuse and switch devices being mounted upon a switch base 58. The remaining parts can be readily identified. It will be seen that a self-contained panel including all of the elements to provide a device of that character is herein disclosed.

In showing the impedance winding 6 as bridged directly across the circuit I do not wish to limit the invention to such an arrangement, but wish of course to contemplate the arrangement wherein that coil might be the secondary of a transformer bridged across the source, as being clearly its equivalent. It will be seen from what has been described that the vibrators 9 and 11 through their vibratory elements 18 and 19 close a circuit for the consumption circuit, which circuit includes the contact elements of the vibrator 38 and which also includes the winding 40 and the winding 6. All of the three vibrators thus coöperate to complete the circuit.

As already stated, the system herein disclosed is an improvement over that disclosed in my application Serial No. 16,564, in that I avoid the use of a double wound primary transformer. It is always difficult to accurately construct transformer windings in parallel in such manner that the effects of each winding will be exactly the same as the effects of the other winding. In order to avoid the use of a double wound transformer, an alternative may be the provision of a duplicate number of contacts controlled by the pole changer vibrator 38 or doubling the contacts of the rectifier vibrators. However, I find that it is extremely difficult on account of the high frequency of alternating current which is utilized to accurately place a plurality of contacts so that a maximum amount of waves can be at all times utilized. On account of the extreme rapidity of movement of the vibratory elements, they will operate most effectively with the least number of contacts that can be used. I find, therefore, that by using twin vibrators so that their elements 18 and 19 are maintained at opposite polarities, that is, one positive and the other negative, that I can use a pole changer vibrator with but two contacts such as the contacts 33 and 34.

In this case, the rectifier vibrators also have but two contacts oppositely disposed, respectively, of their vibratory elements. The pole changer vibrator therefore receives its current directly from the vibratory elements 18 and 19 and as that represents a rectified current, the pole changer vibrator can be used directly in association with a single primary winding of a transformer.

It will be noted that the consumption circuit, which in reality is the transformer winding 41, is directly controlled through the actuations of the pole changer contacts and rectifying vibrator contacts in series. In saying that the transformer winding 41 is in reality the consumption circuit in so far as that term is used in the claims, it will be apparent that the consumption circuit shown by the conductors L, G, H is directly connected to the secondary winding 44 of the transformer 40 so as to inductively associate the consumption circuit with the circuit of the vibrators for special purposes not germane to the system herein concerned.

By the use of the single primary winding the secondary winding may be divided to form different styles of sub-consumption circuits as shown, and as readily apparent.

In the claims I will refer to the vibrators 9 and 11 as rectifying vibrators and the vibrator 38 as the pole changer vibrator in order to prevent confusion in the terminology.

From what has been described the nature of my invention will be readily clear to those skilled in the art, and it will also be clear that my invention is susceptible of modifications within the scope of the appended claims.

Having however thus described one form of my invention, what I claim as new and desire to secure by Letters Patent is:

1. A frequency changer of the character described comprising a source of alternating current, a pair of rectifier vibrators vibrating in synchronism with the alternations of the alternating current supplied by said source, a pole changer vibrator, an impedance winding associated with said source of current, and a consumption circuit extending from a central portion of said impedance winding and having its continuity conjointly controlled by said rectifier vibrators and said pole changer vibrator, whereby the fundamental frequency of the current in said consumption circuit is dependent upon the frequency of vibration of said pole changer vibrator.

2. A frequency changer of the character described comprising a source of alternating current, a pair of rectifier vibrators vibrating in synchronism with the alternations of the alternating current supplied by said source, a pole changer vibrator, an impedance winding associated with said source of current, a consumption circuit extending from a central portion of said impedance winding and having its continuity conjointly controlled by said rectifier vibrators and said pole changer vibrator, whereby the fundamental frequency of the current in said consumption circuit is dependent upon the frequency of vibration of said pole changer vibrator, and a transformer whose primary winding is included serially with said consumption circuit.

3. A frequency changer of the character described comprising a source of alternating current, a pair of rectifier vibrators vibrating in sychronism with the alternations of the alternating current supplied by said source, a pole changer vibrator, an impedance winding associated with said source of current, and a consumption circuit extending from a central portion of said impedance winding and having its continuity conjointly controlled by said rectifier vibrators and said pole changer vibrator, whereby the fundamenal frequency of the current in said consumption circuit is dependent upon the frequency of vibration of said pole changer vibrator, said rectifier vibrators each having a pair of contacts associated respectively with the opposite sides of said source of alternating current together with the coöperating contacts, there being relative motion between each of said coöperating contacts and their associated contacts synchronously with the alternations of the alternating current in said source.

4. A frequency changer of the character described comprising a source of alternating current, a pair of rectifier vibrators vibrating in synchronism with the alternations of the alternating current supplied by said source, a pole changer vibrator, an impedance winding associated with said source of current, a consumption circuit extending from a central portion of said impedance winding and having its continuity conjointly controlled by said rectifier vibrators and said pole changer vibrator, whereby the fundamental frequency of the current in said consumption circuit is dependent upon the frequency of vibration of said pole changer vibrator, and a transformer whose primary winding is included serially with said consumption circuit, said rectifier vibrators each having a pair of contacts associated respectively with the opposite sides of said source of alternating current together with the coöperating contacts, there being relative motion between each of said coöperating contacts and their associated contacts sychronously with the alternations of the alternating current in said source.

5. A frequency changer of the character described comprising a source of alternating current, a pair of rectifier vibrators vibrating in synchronism with the alternations of the alternating current supplied by said source, a pole changer vibrator, an impedance winding associated with said source of current, and a consumption circuit extending from a central portion of said impedance winding and having its continuity conjointly controlled by said rectifier vibrators and said pole changer vibrator, whereby the fundamental frequency of the current in said consumption circuit is dependent upon the frequency of vibration of said pole changer vibrator, said rectifier vibrators each having a pair of contacts associated respectively with the opposite sides of said source of alternating current together with the coöperating contacts, there being relative motion between each of said coöperating contacts and their associated contacts synchronously with the alternations of the alternating current in said source, said pole changer vibrator having coöperating movable contacts, said contacts and the contacts of said rectifier vibrators being serially included in the consumption circuit.

6. A frequency changer of the character described comprising a source of alternating current, a pair of rectifier vibrators vibrating in synchronism with the alternations of the alternating current supplied by said source, a pole changer vibrator, an impedance winding associated with said source of current, a consumption circuit extending from a central portion of said impedance winding and having its continuity conjointly controlled by said rectifier vibrators and said pole changer vibrator, whereby the fundamental frequency of the current in said consumption circuit is dependent upon the frequency of vibration of said pole changer vibrator, and a transformer whose primary winding is included serially with said consumption circuit, said rectifier vibrators each having a pair of contacts associated respectively with the opposite sides of said source of alternating current together with the coöperating contacts, there being relative motion between each of said coöperating contacts and their associated contacts synchronously with the alternations of the alternating current in said source, said pole changer vibrator having coöperating movable contacts, said contacts and the contacts of said rectifier vibrators being serially included in the consumption circuit.

7. A frequency changer of the character described comprising a source of alternating current, a pair of rectifier vibrators vibrating in synchronism with the alternations of the alternating current supplied by said source, each of said vibrators having corresponding movable and stationary contacts, connections whereby the corresponding contacts of said vibrators are maintained at opposite polarities, a pole changer vibrator, and a consumption circuit having its continuity conjointly controlled by said rectifier vibrators and said pole changer vibrators.

8. A frequency changer of the character described comprising a source of alternating current, a pair of rectifier vibrators vibrating in synchronism with the alternations of the alternating current supplied by said source, each rectifier vibrator having a vibratory element, the vibratory elements of said rectifier vibrators being respectively of opposite polarities, a pole changer vibrator, and a consumption circuit having its continuity conjointly controlled by said rectifier vibrators and said pole changer vibrators.

9. A frequency changer of the character described comprising a source of alternating current, a pair of rectifier vibrators vibrating in synchronism with the alternations of the alternating current supplied by said source, each of said vibrators having corresponding movable and stationary contacts, connections whereby the corresponding contacts of said vibrators are maintained at opposite polarities, a pole changer vibrator, and a transformer whose secondary winding is adapted to supply a consumption circuit and whose single primary winding has its circuit continuity conjointly controlled by said rectifier vibrators and said pole changer vibrator.

In witness whereof, I hereunto subscribe my name this 11th day of May, A. D., 1917.

OSCAR M. LEICH.

Witnesses:
  HAZEL A. JONES,
  MAX W. ZABEL.